United States Patent
Cho et al.

(10) Patent No.: US 7,359,351 B2
(45) Date of Patent: Apr. 15, 2008

(54) WIRELESS AUDIO/VIDEO EQUIPMENT AND CHANNEL SELECTING METHOD THEREOF

(75) Inventors: Hyeon Cheol Cho, Seongnam-si (KR); Jin Ho Son, Gwacheon-si (KR); Dong Woon Hahn, Seoul (KR); Dong Hoon Kwak, Seongnam-si (KR); Min Ho Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 81 days.

(21) Appl. No.: 11/292,088

(22) Filed: Dec. 2, 2005

(65) Prior Publication Data
US 2006/0120324 A1   Jun. 8, 2006

(30) Foreign Application Priority Data
Dec. 7, 2004   (KR) .................. 10-2004-0102577

(51) Int. Cl.
*H04Q 7/00* (2006.01)
(52) U.S. Cl. .............. 370/329; 370/252; 370/468; 370/401; 370/332; 370/341; 455/67.11; 455/452.1; 455/434; 455/63.1; 455/450; 455/464
(58) Field of Classification Search ........... 370/329, 370/341, 348, 252, 468, 474, 487, 493, 494; 455/69, 67.11, 445, 522
See application file for complete search history.

(56) References Cited

U.S. PATENT DOCUMENTS

| | | | | |
|---|---|---|---|---|
| 5,680,392 | A * | 10/1997 | Semaan | 370/261 |
| 6,694,141 | B1 * | 2/2004 | Pulkkinen et al. | 455/454 |
| 6,697,013 | B2 * | 2/2004 | McFarland et al. | 342/159 |
| 6,732,163 | B1 | 5/2004 | Halasz | |
| 6,847,805 | B2 * | 1/2005 | Liu | 455/69 |
| 6,859,441 | B2 * | 2/2005 | Dick et al. | 370/252 |
| 6,934,752 | B1 * | 8/2005 | Gubbi | 709/225 |
| 6,947,477 | B2 * | 9/2005 | Struhsaker et al. | 375/222 |
| 7,054,268 | B1 * | 5/2006 | Parantainen et al. | 370/231 |
| 7,092,373 | B2 * | 8/2006 | Parantainen et al. | 370/337 |

(Continued)

FOREIGN PATENT DOCUMENTS

EP   1 257 090 A1   11/2002

(Continued)

OTHER PUBLICATIONS

T. Tandai et al., "Optimum Real-Time data Transmission Scheduling for Channel Searching in IEEE 802.11 Wireless LANs," Vehicular Technology Conference, Sep. 2004, pp. 2645-2649.

*Primary Examiner*—Marceau Milord
(74) *Attorney, Agent, or Firm*—McKenna Long & Aldridge LLP

(57) ABSTRACT

An A/V equipment and a channel selecting method are disclosed, wherein the A/V equipment forms a wireless network by using information of each channel obtained by scanning each channel of a monitoring channel set to compute a predetermined parameter, and comparing the computed parameters to select an optimum channel. Consequently, the A/V equipment is configured to form a wireless network at a channel in which the wireless environment is the most satisfactory, thereby being enabled to satisfy a QoS requirement and to provide good quality of service, and to effectively distribute frequency resources under an environment, where the wireless equipment is mixed exists.

17 Claims, 3 Drawing Sheets

U.S. PATENT DOCUMENTS

| | | | |
|---|---|---|---|
| 7,110,374 B2 * | 9/2006 | Malhotra et al. | 370/329 |
| 7,116,979 B2 * | 10/2006 | Backes et al. | 455/434 |
| 7,123,628 B1 * | 10/2006 | Hwang et al. | 370/469 |
| 7,136,655 B2 * | 11/2006 | Skafidas et al. | 455/450 |
| 7,146,166 B2 * | 12/2006 | Backes et al. | 455/434 |
| 7,149,519 B2 * | 12/2006 | Backes et al. | 455/434 |
| 7,149,520 B2 * | 12/2006 | Backes et al. | 455/434 |
| 7,224,697 B2 * | 5/2007 | Banerjea et al. | 370/401 |
| 2004/0235465 A1 | 11/2004 | Hawe | |

FOREIGN PATENT DOCUMENTS

| | | |
|---|---|---|
| EP | 1 257 093 A1 | 11/2002 |

* cited by examiner

WIRELESS AUDIO/VIDEO EQUIPMENT AND CHANNEL SELECTING METHOD THEREOF

This application claims the benefit of Korean Patent Application No. 2004-0102577, filed on Dec. 7, 2004, which is hereby incorporated by reference for all purposes as if fully set forth herein.

BACKGROUND OF THE INVENTION

1. Field of the Invention

The document relates to wireless audio/video equipment and channel selecting method thereof for formation of a new wireless network by selecting the most appropriate operating channel based on a monitoring result of ambient channel environment around an operable channel scope.

2. Discussion of the Related Art

Recently, the trend is that audio/video (hereinafter referred to as A/V) equipment capable of wireless transmission of multimedia contents such as image and music is on the increase. Concomitant with the increasing trend, the wireless environment has grown more complicated to make the A/V equipment encounter a wireless environment of various ever-present obstacles.

Various communication and non-communication equipment, such as, for example, hot spot service providing apparatuses, personal computers equipped with wireless LAN (Local Area Network), coreless phones and microwave ovens, pollute channel environment where the wireless A/V equipment operates. Still worse, the equipment is invariably turned on and off to make it impossible to anticipate its operating duration.

As a result, it necessitates for the wireless A/V equipment to cope with a complicated wireless environment, and to satisfy a Quality of Service (QoS) requirement for transmission of multimedia contents.

In the conventional data communication, requirement for delay time and throughput is not that strict. For example, if a user receives a file using a wireless network, it is possible to receive the file even though transmission speed is slow due to inferior transmission condition of wireless channel.

However, if a QoS requirement is not met, the wireless A/V equipment transmitting A/V data including image and/or sound data cannot even start transmitting the A/V data. In other words, a user may not use relevant A/V equipment in its entirety.

For example, if a moving picture encoded in 8 Mbps is to be streamed, a user cannot view the moving picture at all if the wireless channel cannot meet the QoS requirement of 8 Mbps.

In case of wireless LAN, wireless channel selection of Access Point (AP) is realized among a channel set allowed by each country. The existing wireless A/V equipment adopts one of two methods in the selection of wireless channels, e.g., manual channel selection and automatic channel selection. The manual channel selection is manually selected by a user at an initial implementation of the AP, and the automatic channel selection is such that the AP is automatically selected at an initial start.

The automatic channel selection is generally selected on a basis of simple condition such as activity per channel or the like. An automatic channel selection of IEEE 802.11a standard which is 5 GHz band wireless LAN supports IEEE 802.11h by dynamic channel selection in response to the European standards.

However, the conventional automatic channel selection is focused more on channel protection for radar than protection of transmission quality of wireless A/V equipment, and there is a problem even in the case of supporting the dynamic channel selection in that poor A/V streaming service results without a standard algorithm being directly embodied.

SUMMARY OF THE INVENTION

An object of the invention is to provide wireless audio/video (A/V) equipment and channel selecting method thereof configured to equip with a channel selection standard and to use a scanning result of each channel to thereby constitute a wireless network with an optimized channel.

In accordance with the object of the present invention, a method of selecting a channel for wireless audio/visual (A/V) equipment is disclosed. The method comprises establishing a monitoring channel set which includes at least one channel operable by the A/V equipment. The method also comprises establishing an operation mode as a station mode and scanning each channel of the monitoring channel set to obtain information. Moreover, the method includes computing a parameter using the obtained information for each channel and selecting an optimized channel condition of a channel from the at least one operable channel by comparing parameters of each channel. Additionally, the method comprises forming a wireless network from the optimized channel condition by converting the operation mode to an Access Point (AP) mode. In one embodiment, the wireless network is a wireless LAN.

Furthermore, the monitoring channel set may include a channel straddled with the at least one operable channel, the channel not being the operable channel. Scanning may include active scanning, wherein the active scanning is used for a wireless communication network conforming to a communication standard of the A/V equipment.

The information to be collected by the A/V equipment includes either information on an external wireless network detected by the scanned channel or information on noise. The predetermined parameter computed by the A/V equipment is computed for at least one operable channel.

The predetermined parameter includes at least one of parameter distance, parameter numBSS_adj, parameter numBSS_adj_legacy, parameter interferers_loc, parameter numBSS_nearest, parameter maxRSSI_nearest and a first center frequency.

In other words, the predetermined parameter includes at least one of the parameter distance which is a distance on a frequency between the computed channel and the nearest interference channel, the parameter numBSS_adj which is the number of external wireless networks within a predetermined adjacent channel scope having influence on the computed channel, the parameter numBSS_adj_legacy which is the number of external wireless networks of legacy standard within a predetermined adjacent channel scope having influence on the computed channel, the parameter interferers_loc which is a relative position of an interference channel relative to the computed channel, the parameter numBSS_nearest which is the number of external wireless networks located at the interference channel nearest to the computed channel, the parameter maxRSSI_nearest which is the maximum value out of signals detected by a channel computed by the respective external wireless networks, and the first center frequency which is a center frequency of channel to be computed.

Priority of high discrimination standard for the parameters is given in the order of parameter distance, parameter numBSS_adj, parameter numBSS_adj_legacy, parameter interferers_loc, parameter numBSS_nearest, parameter maxRSSI_nearest and the first center frequency.

The A/V equipment compares values of a parameter of each operable channel having the highest priority in order to select the optimum channel when the optimum channel is not selected through a comparison of the parameter of each operable channel having the highest priority. If the optimum channel is not selected through the comparison of the parameter of each operable channel having the highest priority, values of a parameter of next order of priority are compared to select the optimum channel. Through the method thus explained, the A/V equipment sequentially compares values of a parameter of each channel based on the priority to select the optimum channel of the operable channels.

The channel states of the parameter numBSS_adj, the parameter numBSS_adj_legacy, the parameter numBSS_nearest, the parameter maxRSSI_nearest and the first center frequency are discriminated satisfactory if the values thereof are small while the channel state of the parameter distance is discriminated satisfactory if the value thereof is large.

In accordance with a further embodiment of the present invention, a method of selecting a channel for wireless A/V equipment is disclosed. The method includes establishing a monitoring channel set where the monitoring channel set includes at least one channel operable by the AN equipment and scanning channels of the monitoring channel set to obtain information. In this embodiment, the monitoring channel set is established by a station mode. The method also includes computing a parameter from the obtained information for the channels of the monitoring channel set and comparing parameters of the channels thereby selecting an optimized condition of a channel from operable channels of the channels. Furthermore, the method converts the operation mode to an Access Point (AP) mode thereby forming a wireless network from the optimized channel condition.

DETAILED DESCRIPTION OF THE PREFERRED EMBODIMENTS

The preferred embodiments of the present invention will be described hereinafter with reference to the accompanying drawings.

The A/V (Audio/Video) equipment according to the present invention selects a channel of optimum channel state out of operable channels to thereby form a new wireless network based on monitored information relative to broad scope of channel set including actually operable channel, i.e., operable channel and adjacent ambient channels as well.

In consideration of an external wireless network or noise working as a communication obstacle relative to the A/V equipment according to the present invention, a channel in which the external wireless network or the noise is not detected or at least is less detected is selected as an optimum channel. The external wireless network is a network operated in a space, and is a network not formed or connected by the wireless A/V equipment.

The A/V equipment according to the present invention is one of those devices connectable to a wireless network, and can either transmit or receive at least an image signal or a sound signal. The A/V equipment according to the present invention can be operated as a master or a slave, and is applicable when operating as a master device.

Figure 1:
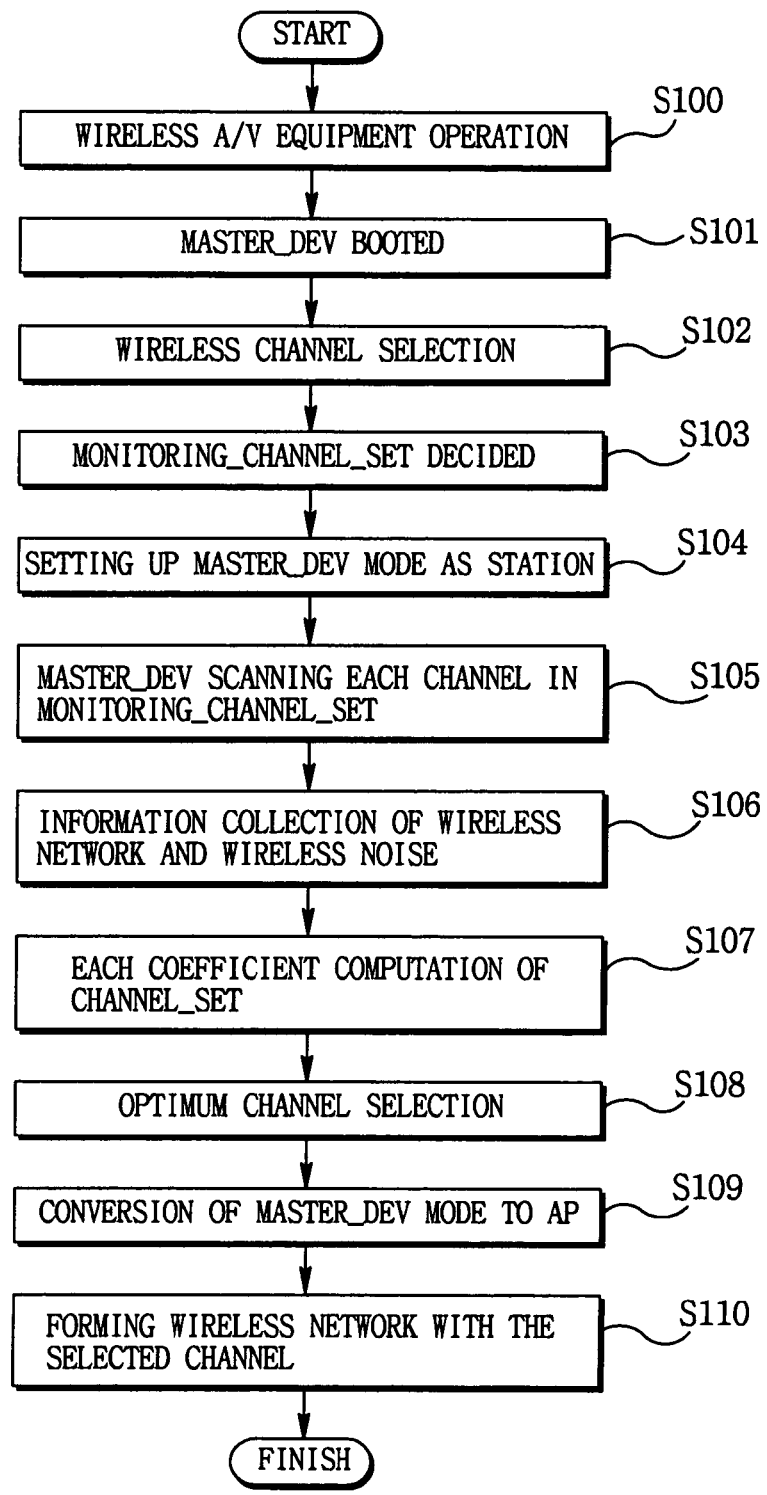
FIG. 1 is a flow chart illustrating a channel selecting method of a wireless A/V equipment according to the present invention.

Now, the channel selecting method according to the present invention will be described in detail with reference to FIG. 1, and for further explicit explanation, FIGS. 2 through 4 will be used as reference.

The A/V equipment works as a master (S101) as soon as the A/V equipment starts to operate (S100).

The A/V equipment establishes a wireless channel set (hereinafter referred to as 'Channel_SET') including a channel operable in wireless channels. The Channel_SET may be expressed as $\{Ch\_1, Ch\_2, \ldots, Ch\_N\}$. The channel operable by the A/V equipment in the wireless channels may vary according to country and region (S102).

Successively, the A/V equipment establishes a Monitoring_Channel_Set which is a channel set to be monitored according to the operating. The Monitoring_Channel_Set includes the Channel_SET at S102.

In general, individual channels are not completely separated but mutually straddled (Straddled Band Planning),so that the wireless A/V equipment should monitor even channels straddled on each channel of the Channel_SET and not included in the Channel_SET. For example, if the A/V wireless equipment operates from Ch_1 through Ch_N, the band of Ch_N may straddle on bands such as Ch_(N+1), Ch_(N+2), each of which is larger than the band of Ch_N. As a result, the Monitoring_Channel_Set is expressed by the following Equation 1 (S103).

$$\text{Monitoring\_Channel\_Set} = \text{Channel\_SET} \cup \{Ch\_A, Ch\_B, \ldots, Ch\_X\} \quad [\text{Equation 1}]$$

where, $\{Ch\_A, Ch\_B, \ldots, Ch\_X\}$ are channels which may be straddled on each channel of Channel_SET.

Figure 2:
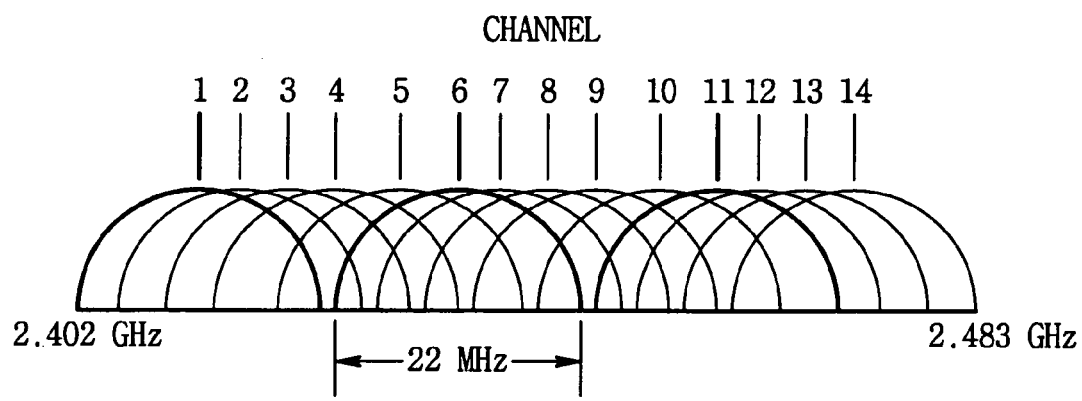
FIG. 2 is an exemplary drawing of IEEE 802.11 Straddled channel in 2.4 GHz band.

Referring to FIG. 2, if the Channel_SET is $\{1, 2, \ldots, 11\}$, the Monitoring_Channel_Set may be formed by $\{1, 2, \ldots, 11\} \cup \{12, 13\} = \{1, 2, \ldots, 12, 13\}$.

At S103, if the Monitoring_Channel_Set is determined, the A/V equipment establishes the operating mode as station (S104).

Furthermore, the A/V equipment implements active and/or passive scanning relative to each channel within the Monitoring_Channel_Set (S105), and obtains information on the external wireless network and noise detected per channel (S106).

Successively, the A/V equipment computes a predetermined parameter relative to each channel based on information collected by the active and/or passive scanning (S107).

The A/V equipment compares the channels contained in the Channel_SET to select a channel which can form and maintain an optimum wireless network. The comparison of the channels is conducted by comparison of predetermined parameters computed at S107 (S108).

Next, the A/V equipment converts its operating mode from station mode to AP mode (S109), and forms a new wireless network from the previously selected optimum channel (S110).

The channel selecting method of the A/V equipment according to the present invention is realized by the methods thus described.

Now, the channel selecting method of A/V equipment according to the present invention will be further described with reference to S106 through S108.

At S106, information on the external wireless network obtainable by scanning includes kinds of networks and strength of received signal.

The kinds of networks denote the wireless network standards such as IEEE 802.11a or IEEE 802.11b. The strength of received signal corresponds to RSSI (Received Signal Strength Indication) indicated in dBm unit.

Furthermore, information on noise generally includes NF (Noise Figure) indicated in dBm unit. The noise figure may be limited only to a value larger than a threshold noise value while ignoring a value smaller than the threshold noise value.

An example of the information on the detected external wireless network will be described with reference to FIG. 4. It should be noted however that method and contents thereof for indicating the information on the external wireless network are not limited to those of FIG. 4.

Figure 4:
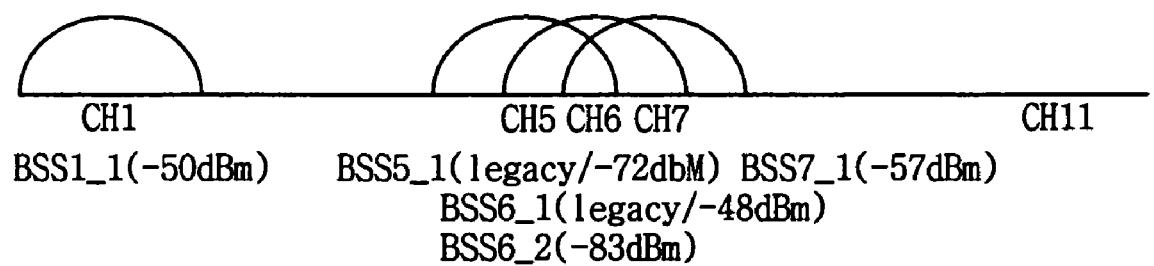
FIG. 4 is an exemplary drawing in which an external wireless network is scanned according to the channel selecting method of FIG. 1.

FIG. 4 shows that the external wireless network searched by the scanning exists in CH 1, 5, 6 and 7. Furthermore, CH 6 is detected with two external wireless networks.

The information on the detected external wireless networks is shown in the bottom of the drawing, and BSS6_1 (legacy/−48 dBm) will be explained as an example.

BSS6_1(legacy/−48 dBm) represents that a first wireless network having a reception signal strength of −48 dBm (absolute value) at CH 6 has been detected. Furthermore, it also represents that the detected external wireless network is legacy standard relative to a communication standard in which the A/V equipment according to the present invention is operating.

The legacy standard represents a pre-announced network compatible with network standard of A/V equipment in which detected relevant external wireless network has implemented the scanning. If the wireless A/V equipment is provided in IEEE 802.11g standard, the external wireless network detected by CH 6 is IEEE 802.11b or IEEE 802.11 standard.

The external wireless network detected by the scanning can be measured in several numbers per channel, whereas the wireless noise is measured only in one value per channel. This is because, when the A/V equipment scans each channel, signals of other channels are all understood as one single noise because scanning is carried out by being tuned to a center frequency of each channel.

In case active and passive scannings are all allowed, the A/V equipment obtains information on the external wireless network of the same communication standard with the priority given on the active scanning. However, the active scanning is allowed to be used only for a wireless communication network conforming to the same communication standard, a passive scanning is additionally carried out in order to collect information on an external wireless network conforming to other wireless standard and information of wireless noise of non-communication apparatus.

At a step of S107, parameter of each channel computed by the wireless A/V equipment is given in the following Table 1. The Table 1 indicates definition of parameters provided for channel selection, priority and discrimination criteria of relevant parameters.

TABLE 1

| Priority | parameter | definition | Discrimination criteria |
|---|---|---|---|
| 1 | distance | Distance on frequency from nearest interference channel | The larger the better |
| 2 | numBSS_adj | Number of external wireless networks within adjacent channel | The smaller the better |
| 3 | numBSS_adj_legacy | Number of external wireless networks having a node of IEEE 802.11b standard within adjacent channel | The smaller the better |
| 4 | interferers_loc | Position of interference channel | Good in the order of first state, second state and third state |
| 5 | numBSS_nearest | Number of external wireless networks of channel where nearest interference signal is located | The smaller the better |
| 6 | maxRSSI_nearest | Maximum value of interference RSSI corrected by spectrum mask | The smaller the better |
| 7 | First center frequency | Center frequency of relevant channel | The smaller the better |

The parameter distance denotes a distance on frequency between relevant channel and the nearest interference channel, and in order to compute the parameter distance, values of a first center frequency, a second center frequency and a third center frequency are needed. The parameter distance is a smaller value (Hz) between a difference of an absolute value between a first center frequency of a channel and a second center frequency and a difference of an absolute value between the first center frequency and a third center frequency.

The first center frequency is a center frequency (Hz) of relevant channel computing the parameter distance.

The second center frequency is the largest value among values that are smaller than the first center frequency out of center frequencies (Hz) of a channel in which either noise or an external wireless network operating in a space is detected.

The third center frequency is the smallest value among values that are equal or larger than the first center frequency out of center frequencies (Hz) of a channel in which either noise or an external wireless network operating in a space is detected.

If the external wireless network and noise are not detected, the second center frequency has a value of −∞, and the third center frequency has a value of ∞. If operating external wireless network or noise is detected from the channel computing the parameter distance, the second and third center frequencies are the same as the first center frequency.

Referring to FIG. 4, a case of computing the parameter distance of CH 10 will be explained as an example. Channels in which an external wireless network is detected out of the Channel_SET are CH 1, 5, 6, 7 and 11. The first center frequency will be the center frequency of CH 10. The second frequency is the center frequency of CH 7.

In case of CH 2, the third center frequency is the center frequency of CH 5, and in case of CH 10, the third center frequency becomes ∞.

Consequently, in case of computing the parameter distance of CH 8 from FIG. 4, it is the smallest value (Hz) out of a difference between the first center frequency (center frequency of CH 8) and the second center frequency (center frequency of CH 7) and a difference between the third center frequency (∞) and the first center frequency, such that it will be a value where the center frequency of CH 8 is subtracted from the center frequency of CH 7.

The parameter numBSS_adj denotes the number of external wireless networks existing within an adjacent channel having influence on relevant channel based on a center frequency of the relevant channel.

Figure 3:
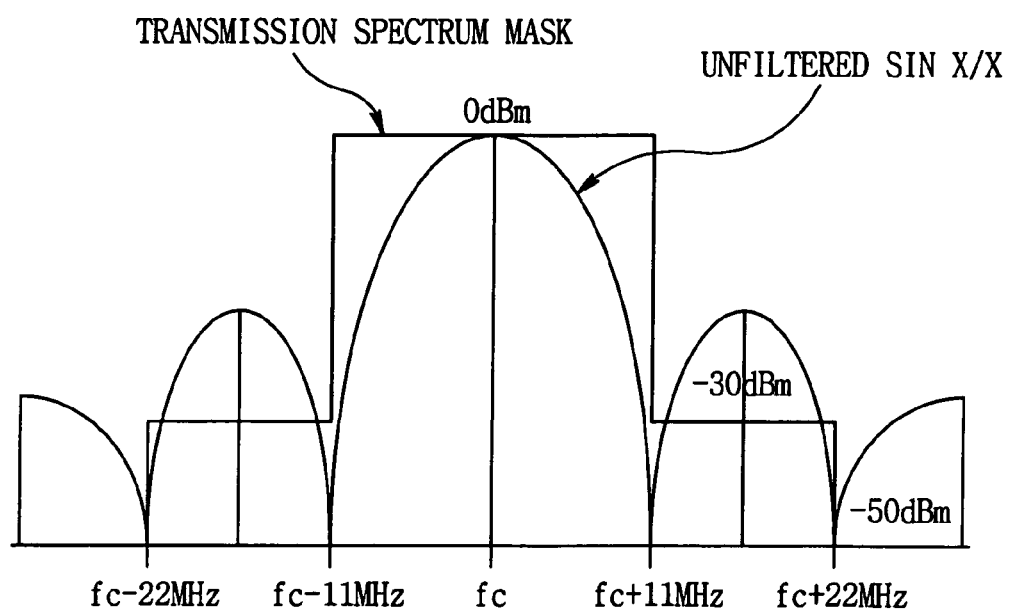
FIG. 3 is a wave form diagram of IEEE 802.11b/g spectrum mask in 2.4 GHz band.

The scope of the adjacent channel having influence on the relevant channel is established on the basis of spectrum mask of FIG. 3. The spectrum mask is established for classification of each channel of wireless LAN, and may be determined according to the size of the relevant channel.

The parameter numBSS_adj is obtained by adding up all the number of the external wireless networks existing within the scope including a predetermined number (N) of channels before and after the relevant channel computing the parameter. If N is 2, and the relevant channel is CH 6, the parameter numBSS_adj is the number of external wireless networks existing in CH 4 through CH 8.

If N is 2 in FIG. 4, the parameter numBSS_adj is 1 when the relevant channel is CH 1, and the parameter numBSS_adj is 4 when the relevant channel is CH 6.

Here, N denotes the number of adjacent channels straddled on the relevant channel when channel plan comes of a straddled planning. According to spectrum mask of FIG. 3, the non-attenuated bandwidth is 22 MHz, such that, although the channel gap is 5 MHz in case of IEEE 802.11 network of FIGS. 2 AND 4, the non-attenuated bandwidth of the channel is 22 MHz. As a result, it is appropriate that the channel scope (N) affecting the relevant channel is 2.

Next, the parameter numBSS_adj_legacy is the number of legacy wireless networks supporting the low channel speed in a channel within an adjacent channel scope about the relevant channel.

Here, the adjacent channel scope is determined in consideration of a scope affected by the spectrum mask just like the parameter numBSS_adj.

In order to compute the parameter numBSS_adj_legacy, first of all, the same channel/band per channel are used to obtain the number of legacy to obtain the number of legacy external wireless network supporting a channel speed lower than that of the wireless network formed by the present invention. For example, if the wireless network to be formed by the wireless A/V equipment according to the present invention is IEEE 802.11b standard (maximum channel speed 11 Mbps), the wireless network conforming to the legacy standard is IEEE 802.11 standard (maximum channel speed 2 Mbps). Furthermore, if the wireless network formed by the present invention is 802.11g (maximum channel speed 54 Mbps), the wireless network conforming to the legacy standard is 802.11 or 802.11b.

Consequently, the number of legacy external wireless networks is obtained in the same method as that of the parameter numBSS_adj_legacy. For example, if N is 2 in FIG. 4, the parameter numBSS_adj_legacy of CH 6 becomes 2 by adding up the external wireless network detected by CH 5 and the external wireless network detected by CH 6.

Next, the parameter interferers_loc is position information of interference channel. The parameter interferers_loc is divided into three states.

A first state is where the second center frequency of the relevant channel is −∞ and the third center frequency is ∞. A second state is either one state of the following two cases, where one case is the second center frequency being −∞ and the third center frequency not being ∞, and the other case is the second center frequency not being −∞ and the third center frequency being ∞. Other states that do not belong to the first and second state are considered as belonging to a third state.

Because a case having not a single interference channel is considered as being a good one, and according to the parameter interferers_loc, it is discriminated that the first state has the most satisfactory channel state, while the channel state becomes deteriorated as it goes to the second and third state.

Referring to FIG. 4 as an example, the parameter interferers_loc of CH 5 is in the third state, and the parameter interferers_loc of CH 11 is in the second state. As a result, it can be said that CH 11 is more satisfactory than CH 5 in terms of channel state.

Next, the parameter numBSS_nearest is the number of external wireless networks of a channel including relevant channel in which the nearest interference signal is located.

For example, the parameter numBSS_nearest in case of CH 10 becomes 1 in FIG. 4, and the parameter numBSS_nearest becomes 2 in case of CH 6.

Next, the parameter maxRSSI_nearest is the maximum value among the RSSI (Received Signal Strength Indication) estimates affected by each external wireless network to the relevant channels. RSSI is the strength of reception signal in dBm unit.

RSSI estimates are RSSI of each external wireless network detectable by the relevant channel. The relevant channel can accurately measure only the RSSI of the external wireless network having a center frequency thereat, and the external wireless network operating at the other channel is discriminated as noise and cannot obtain the accurate RSSI. The RSSI of external wireless network of other channel uses the estimate. In this case, if there are more than two external wireless networks at one channel, the RSSI uses a larger value thereamong.

The RSSI estimate uses a standard relative to the spectrum mask of FIG. 3. Now referring to FIG. 3, the IEEE 802.11 network in the 2.4 GHz band has no attenuation at ±11 MHz around the center frequency fc (=X GHz) because of the spectrum mask and in case of fc±11 MHz~fc±22 MHz there is an attenuation of 30 dBm. According to the other embodiment of the present invention, estimates can be determined in response to the other pre-established standards than the spectrum mask of FIG. 3.

Consequently, if the center frequency of the external wireless network is located within ±11 MHz from the center frequency of relevant channel seeking the parameter maxRSSI_nearest, the RSSI estimate becomes the RSSI itself of an external wireless network having no attenuation.

If the center frequency of the external wireless network is located at ±11 MHz~±22 MHz from the center frequency of relevant channel seeking the parameter maxRSSI_nearest, the RSSI estimate is a value of RSSI of relevant external wireless network minus 30 dBm.

If the parameter maxRSSI_nearest in CH 11 is given as an example, the RSSI estimate of external wireless network in CH 6 is a value of −48 dBm minus 50 dBm, and the RSSI estimate in CH 7 is −87 dBm (−57 dBm minus 30 dBm). Consequently, the maxRSSI_nearest in CH 11 is −87 dBm.

Depending on the embodiments, a threshold of the RSSI value is established in consideration of the reception strength of the wireless A/V equipment. Furthermore, if RSSI of all measured signals or estimates thereof are smaller than the threshold values, relevant measurement values or estimates become estimates.

Hereinafter at S108, a method of selecting a channel will be described according to the priority of Table 1 and discrimination criteria using Channel_SET of each parameter.

In Table 1, a parameter of higher priority comes of a high discrimination criteria and discrimination criteria of lower priority is used when it is impossible to discriminate at the higher priorities. An optimum channel is selected by comparison from the higher parameters based on the relevant discrimination criteria.

In other words, a channel of good state is selected based on discrimination of parameter distance which is the first priority. However, if values of the first priority are of the same ones, discrimination is made on the basis of the parameter numBSS_adj which is the second priority. Through the process thus explained, comparison is made up to the seventh priority to select the optimum channel. The first center frequency of the seventh priority which is the last comparison subject selects one optimum channel based on Table 1 because other channels do not have the same center frequencies.

Hereinafter, the discrimination criteria of Table 1 will be explained in detail.

It is better for the parameter distance to be a larger value among values of parameter distance because a relevant channel is less influenced by the interference channel as far as it is located from a long distance in terms of frequency.

It is better for the parameter numBSS_adj to be a smaller value among values of parameter numBSS_adj because traffic possibility is as high as the number of wireless networks increases.

It is better for the parameter numBSS_adj_legacy to be a smaller value among values of numBSS_adj_legacy because influence by low rate node becomes severe as the number of nodes of IEEE 802.11b standard increases.

Furthermore, the parameter interferers_loc is better in the order of the first state, the second state and the third state because the relevant channel is less influenced when the interference channel is located on one side of the relevant channel compared with the interference channel being located on both sides of the relevant channel.

It is better for the parameter numBSS_nearest to be a smaller value among values of numBSS_nearest because the relevant channel is less influenced if the nearest interference channel is surrounded with less number of wireless networks.

Furthermore, it is better for the parameter maxRSSI_nearest to be a smaller value among values of maxRSSI_nearest because of the possibility that the relevant channel can be physically further distanced from the interference channel as the corrected RSSI value decreases.

It is better for the first center frequency to be a smaller value among values of first center frequency because as frequencies decrease, the permeability is increased. The first center frequencies of compared channels are not the same, and in case of comparing the first center frequencies of the seventh priority, the wireless A/V equipment selects a channel of low frequency band because other conditions are similar thereamong regardless of the channels.

As apparent from the foregoing, the present invention relates to a channel selecting method of wireless A/V equipment for selecting an optimal channel by recognizing a wireless network environment and has the following effects.

Firstly, wireless network is formed on a channel where an wireless environment is satisfactory, such that an A/V equipment can satisfy a QoS condition to enable and provide a good quality of service. The data communication device applied by the present invention can improve a file transmission speed. The A/V equipment according to the present invention gives top priority to distances on the frequency from an interference channel based on the optimum channel selection criteria, and if the distances on the frequency are the same, influence of the wireless network on an adjacent channel is used as an estimate to thereby enable and discriminate an actual interference possibility.

Secondly, the present invention adopts as a top priority for selecting the channel a distance on the frequency between the interference channel and the wireless equipment network to allow frequency resources to be effectively distributed under an environment where wireless equipment is rampant.

Thirdly, a channel selecting method can be used for embodying a dynamic channel selection of IEEE 802.11 in a standard domain required by IEEE 802.11h.

Fourthly, the present invention can be applied to various home appliances and information equipment using wireless networks such as wireless A/V equipment and wireless data communication equipment, whereby the equipment can be operated under an optimum wireless environment.

The present invention has been described above in varied detail by reference to particular embodiments and figures. However, these specifics should not be considered as limitations on the scope of the invention, but merely as illustrations of some of the presently preferred exemplary embodiments. It is to be further understood that other modifications or substitutions may be made by those skilled in the art without departing from the broad scope of the invention. The modifications or substitutions should not be understood individually from the scope of the technical ideas or aspects of the present invention.

What is claimed is:

1. A method of selecting a channel for wireless audio/visual (A/V) equipment, comprising:
    establishing a monitoring channel set, the monitoring channel set including at least one channel operable by the A/V equipment;
    establishing an operation mode as a station mode;
    scanning each channel of the monitoring channel set to obtain information;
    computing a parameter based upon the obtained information for each channel;
    selecting a channel with optimized condition from operable channels by comparing parameters of each channel; and
    forming a wireless network using the selected channel by converting the operation mode to an Access Point (AP) modes,
    wherein the parameter computed by the AV equipment is computed for the at least one operable channel,
    wherein the parameter includes at least one of a parameter distance, which is a distance on a frequency between the computed channel and an interference channel nearest the computed channel;
        a parameter numBSS_adj, which is a number of external wireless networks within an adjacent channel scope having influence on the computed channel;
        a parameter numBSS_adj_legacy, which is a number of external wireless networks of a legacy standard within an adjacent channel scope having influence on the computed channel;
        a parameter interferers_loc, which is a position of an interference channel relative to the computed channel;
        a parameter numBSS_nearest, which is a number of external wireless networks located at an interference channel nearest to the computed channel;
        a parameter maxRSSI_nearest, which is a maximum value of signal strengths detected by a channel computed by the external wireless networks; and
        a first center frequency which is a center frequency of a channel to be computed.

2. The method as recited in claim 1, wherein the wireless network is a wireless LAN.

3. The method as recited in claim 1, wherein the monitoring channel set further comprises:
a channel straddled with the at least one operable channel wherein the straddled channel is not the operable channel.

4. The method as recited in claim 1, wherein scanning each channel comprises active scanning, the active scanning being configured for a wireless communication network conforming to a communication standard of the A/V equipment.

5. The method as recited in claim 4, wherein the operation of scanning comprises passive scanning, the passive scanning being configured for a wireless communication network which conforms to a communication standard different from the A/V equipment communication standard.

6. The method as recited in claim 1, wherein the detected noise information includes a wireless noise signal strength of the scanned channel.

7. The method as recited in claim 1, wherein the parameter distance is a smaller value of a first difference between the first center frequency and a second center frequency and a second difference between the first center frequency and a third center frequency, wherein the second center frequency is a largest frequency among center frequencies that are smaller than the first center frequency out of a channel in which noise or an external wireless network operating in a space is detected, and wherein the third frequency a smallest frequency among frequencies that are equal to or larger than the first center frequency out of a channel in which noise or an external wireless network operate.

8. The method as recited in claim 7, wherein the second center frequency is denoted by a value of $-\infty$ and the third center frequency is denoted by a value of $\infty$ when the external wireless network and noise are not detected.

9. The method as recited in claim 1, wherein an adjacent channel scope of the parameter numBSS_adj comprises a channel in which a signal size is maintained on the computed channel by a spectrum mask of a wireless LAN.

10. The method as recited in claim 1, wherein an adjacent channel scope of the parameter numBSS_adj_legacy comprises a channel in which a signal size is maintained on the computed channel computed by a spectrum mask of a wireless LAN.

11. The method as recited in claim 1, wherein the parameter interferers_loc is classified into three states comprising a first state that includes no detection of external wireless or noise in any channel of the monitoring-channel set; a second state where the detected center frequency of the interference channel is a value smaller or larger than the first center frequency; and a third state configured for cases that are different and not classifiable in at least one of the first state and the second state.

12. The method as recited in claim 1, wherein the parameter maxRSSI nearest is the maximum value among signal strength values of signals detected on the computed channels by the external wireless network, the signal strength values being based on an attenuation pre-set in response to a distance from the center frequency of the computed channel.

13. The method as recited in claim 12, wherein the attenuation includes attenuation associated with a wireless LAN spectrum mask established for each external wireless network.

14. The method as recited in claim 1, wherein priority of a high discrimination standard for the parameters is given in an order of the parameter distance, the parameter numBSS_adj, the parameter numBSS_adj_legacy, the parameter interferers_loc, the parameter numBSS_nearest, the parameter maxRSSI_nearest and the first center frequency.

15. The method as recited in claim 14, wherein the A/V equipment compares values of a parameter of each operable channel having the next highest priority in order to select the optimum channel when the optimum channel is not selected through a comparison of the parameter of each operable channel having the highest priority.

16. The method as recited in claim 1, wherein the channel states of the parameter numBSS_adj, the parameter numBSS_adj_legacy, the parameter numBSS_nearest, the parameter maxRSSI_nearest and the first center frequency are discriminated as satisfactory if the values are small with respect to other values corresponding to each parameter, while the channel state of the parameter distance is discriminated as satisfactory if the value is large with respect to other values of parameter distance.

17. A method of selecting a channel for wireless audio/visual (A/V) equipment comprising:
establishing a monitoring channel set, the monitoring channel set including at least one channel operable by the A/V equipment;
scanning channels of the monitoring channel set to obtain information,
wherein the monitoring channel set is established by a station mode;
computing a parameter from the obtained information for the channels of the monitoring channel set;
comparing parameters of the channels thereby selecting a channel with optimized condition from operable channels of the channels; and
converting the operation mode to an Access Point (AP) mode and forming a wireless network using the selected channel,
wherein the parameter is computed for at least one operable channel,
and the parameter comprises at least one of a parameter distance, which is a distance on a frequency between the computed channel and an interference channel nearest the computed channel;
a parameter numBSS_adj, which is a number of external wireless networks within an adjacent channel scope having influence on the computed channel;
a parameter numBSS_adj_legacy, which is a number of external wireless networks of a legacy standard within an adjacent channel scope having influence on the computed channel;
a parameter interferers_loc, which is a position of an interference channel relative to the computed channel;
a parameter numBSS_nearest, which is a number of external wireless networks located at an interference channel nearest to the computed channel;
a parameter maxRSSI_nearest, which is a maximum value among signal strengths detected by a channel computed by the external wireless networks;
and a first center frequency, which is a center frequency to be computed.

* * * * *